Aug. 3, 1943. F. M. SALISBURY Re. 22,361
ADAPTER FOR MOUNTING MACHINE GUNS
Original Filed Jan. 20, 1938 2 Sheets-Sheet 1
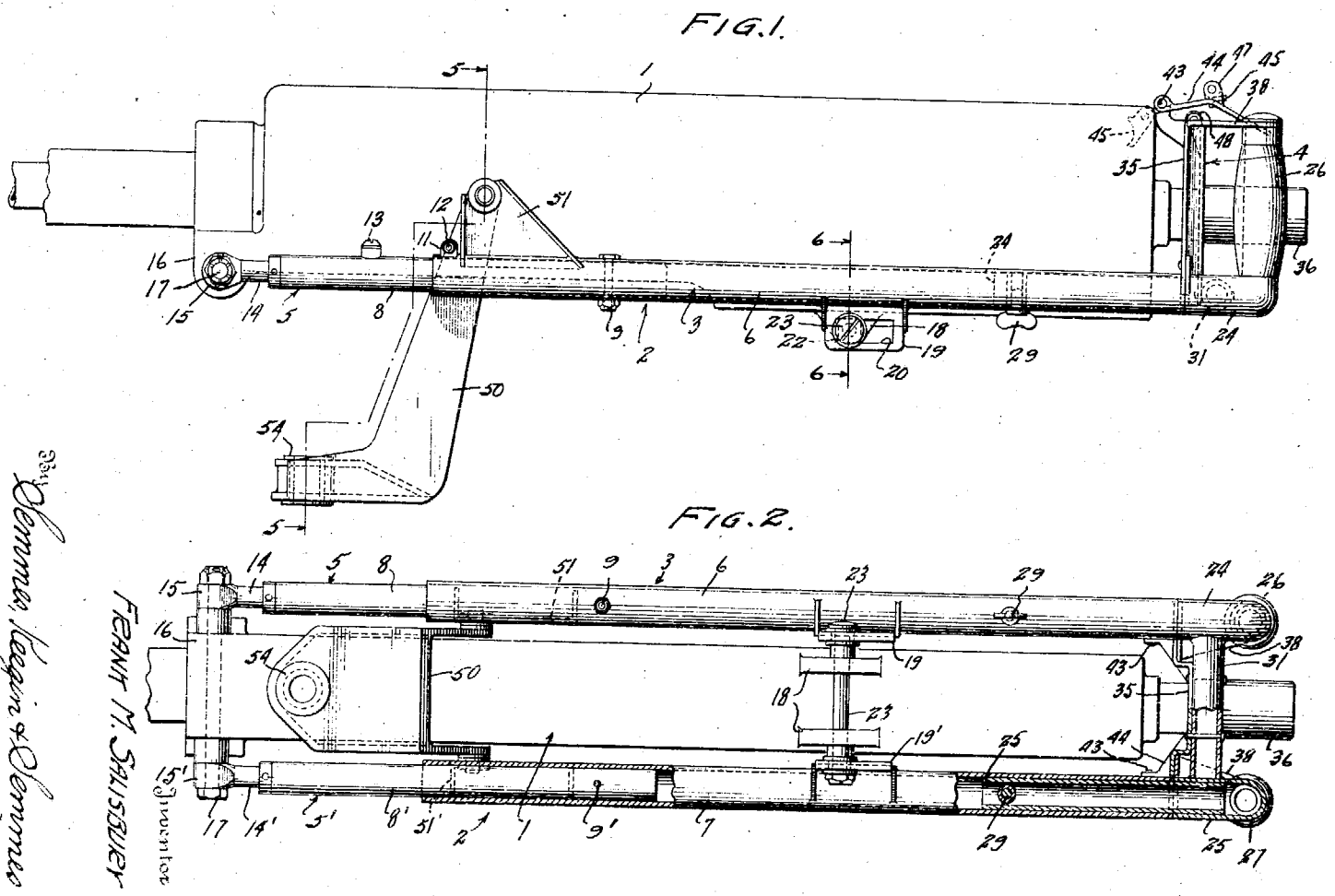
Inventor
FRANK M. SALISBURY
By Semmes, Keegin & Semmes
Attorneys Aug. 3, 1943. F. M. SALISBURY Re. 22,361

ADAPTER FOR MOUNTING MACHINE GUNS

Original Filed Jan. 20, 1938 2 Sheets-Sheet 2

Inventor
FRANK M. SALISBURY

By Semmes, Keegin & Semmes
Attorneys

Reissued Aug. 3, 1943

Re. 22,361

UNITED STATES PATENT OFFICE 22,361

ADAPTER FOR MOUNTING MACHINE GUNS

Frank M. Salisbury, Kenmore, N. Y., assignor to Bell Aircraft Corp., Buffalo, N. Y., a corporation of New York Original No. 2,261,526, dated November 4, 1941, Serial No. 185,974, January 20, 1938. Application for reissue February 19, 1942, Serial No. 431,606

9 Claims. (Cl. 89—37)

This invention relates to mounting machine guns, and more particularly to an adapter, the frame of which is so constructed that small hydraulic shock dampeners may be efficiently used to absorb the recoil without materially increasing the size or weight of the assembled gun.

At the present time, the energy exerted by the recoil of the gun is usually dissipated by the use of spring dampeners, although hydraulic dampeners have also been used. To adequately take up the shock of the recoil of the gun, both the spring and hydraulic dampeners, that are now in use, must be of such a large size that a heavy cumbersome frame must be provided thus adding materially to the weight of the assembled gun. Furthermore, because of the size of these shock dampeners, a type of frame which is too large to be used in cramped quarters is required.

Many of these shock dampeners also require the grips of the gun to be placed at a considerable distance from each other. This wide spacing of the gun grips prevents trained gunners from getting the feel of the gun.

One of the objects of this invention is to avoid the above mentioned disadvantages of the prior art.

Still another object of this invention is to provide an adapter for a machine gun which is provided with a frame in which the gun may move, the outside dimensions of which are only slightly greater than the dimensions of the gun itself.

Yet another object of this invention is to provide a frame for a machine gun in which it may move to permit the efficient operation of the hydraulic shock dampeners with which the frame is provided.

A further object of this invention is to provide a machine gun adapter which holds the back plate of the gun in locked position by means of a back plate detachably mounted on the frame of the adapter, thereby eliminating the use of a secondary latch.

Yet another object of this invention is to provide a frame for a machine gun having the least possible weight.

In the drawings:

Figure 1 is a side elevational view showing a machine gun mounted in operative position in the frame.

Figure 2 is a bottom plan view partly in section.

Figure 3:
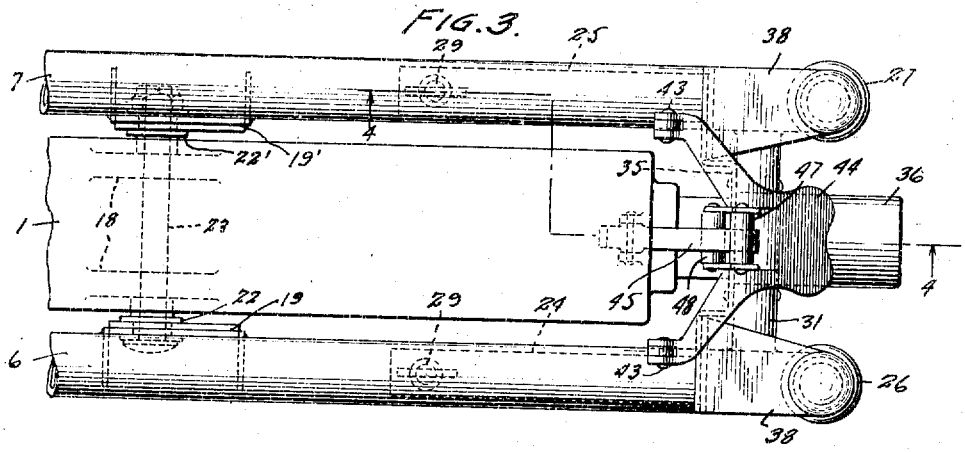
Figure 3 is a top plan view of the rear portion of the machine gun.
Figure 4:
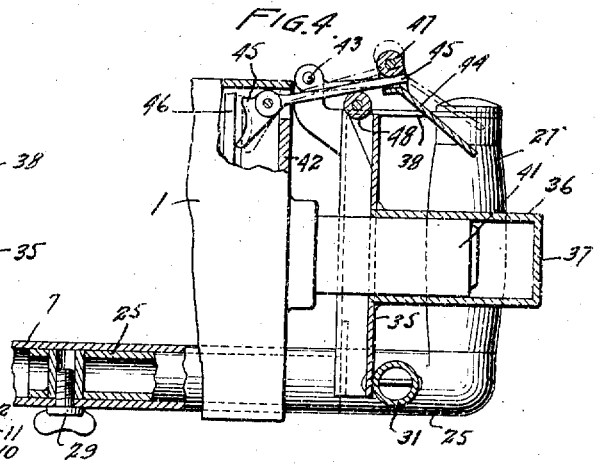
Figure 4 is a view taken along line 4—4 of Figure 3 looking in the direction of the arrows.

This invention consists of a machine gun adapter, the frame of which is constructed of a light material and is only slightly wider than the gun itself. The light construction of this frame is possible because the forward mounting of the machine gun is directly attached to a pair of very efficient hydraulic shock dampeners which so minimize the recoil shock of the gun that heavy mounting is no longer necessary. These shock dampeners are so carried by the hollow tubing frame that the dimensions of this adapter are reduced to a minimum.

Detachably mounted on the frame is a back plate, which carries a pair of handles to operate the gun, and a trigger actuating mechanism. This back plate is so formed and positioned in such a manner as to hold the back plate of the gun locked without the use of additional latches. This method of attaching the back plate to the frame enables the operator to have easy access to the mechanism of the gun.

Because of the novel construction outlined above, this adapter permits accurate aiming and firing of the gun. This construction also permits the gun to be mounted on any type of fixed or flexible mounting. Furthermore, due to the dimensions of the frame, the gun may be used in cramped quarters such as encountered in airplane construction.

As shown in the drawings, this invention consists of a reciprocating gun, generally designated by the numeral 1, which may be of any suitable type, but a 50 caliber aircraft gun is shown here for purposes of illustration. This machine gun is provided with an adapter generally designated by the numeral 2, which consists of a frame 3, a back plate 4, and a pair of hydraulic shock dampeners 5.

The frame 3 consists of a pair of horizontally extending parallel tubes 6 and 7. Partly inserted in the open end of tube 6 is the cylinder 8 of the shock dampener 5 which is rigidly attached to the tube 6 in any suitable manner, such as the nut and bolt arrangement shown at 9. The tube 6 is also slotted near its end as at 10 and is provided with ears 11 on either side of this slot. By means of a nut and bolt 12, the ears are drawn together thereby tightening this portion of the tube 6 securely around the cylinder 8.

The shock dampener 5 is provided with a plug 13 which may be removed to fill the device with oil. The cylinder 8 also carries a piston 14 which terminates in an eye 15.

The tube 7 is similar to tube 6 and carries members which are similar to the ones just described, to which are attached identical numerals except that they are primed.

The gun 1 is provided with a forward mounting lug 16 to which is attached the piston rods 14 and 14', of the hydraulic shock dampeners 5 by means of a bolt 17 which extends through the eyes 15 and 15' and the forward mounting lug 16 of the gun. The gun 1 is also provided with a rear mount which consists of a pair of lugs 18.

Figure 6:
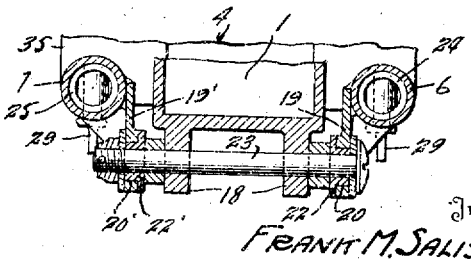
Figure 6 is a view taken along line 6—6 of Figure 1 looking in the direction of the arrows.

Mounted on the tubes 6 and 7 are downwardly extending slide tracks 19 and 19' which may be attached to the tubes in any suitable manner, and which are provided with slots 20 and 20'. As best shown in Figure 6, the slots 20 and 20' carry flanged slide blocks 22 and 22' which are adapted to slide in the said slide tracks. The gun is attached to the slide blocks 22 and 22' by means of a bolt 23 which also passes through the lugs 18.

The rearward ends of the tubes 6 and 7 carry right angle extensions 24 and 25 of a pair of handles 26 and 27, which are inserted in the tubes and held in place by means of wing nuts 29. These handles are connected by means of a transverse tube 31. Attached to the transverse tube 31 is a ribbed back plate 35, in the center portion of which is a tube 36 having a closed end 37. The back plate 35 is supported at its top by means of extensions 38 which are rigidly secured to the top portions of the handles 26 and 27 respectively. The tube 36 houses and serves as a guard or shield for protecting the operator against the gun buffer extension 41 which projects rearwardly from the back plate 42 and which moves with the gun relatively to the frame. Thus the hands of the operator are protected against injury due to the reciprocating movement of the gun and the buffer extension 41 extending rearwardly therefrom.

Pivotally attached to the plate 35 as at 43, to occupy virtually the conventional trigger position, is a trigger 44. The trigger 44 is adapted to actuate a pivoted lever 45 which in turn actuates the release mechanism, designated 46, to fire the gun. It is, of course, understood that, due to the recoil when the gun is fired, there will be a relative movement between the back plate 35 to which the trigger 44 is attached and the gun 1 to which the lever 45 is attached. To minimize friction between the trigger and lever, there is provided a pair of rollers 47 and 48. The roller 47 is attached to the trigger 44 and the roller 48 attached to the back plate 35 immediately below it. When the trigger 44 is depressed, the roller 47 moves the lever 45 down against the roller 48 and as the gun fires the lever 45 reciprocates between these rollers with a minimum of friction.

Figure 5:
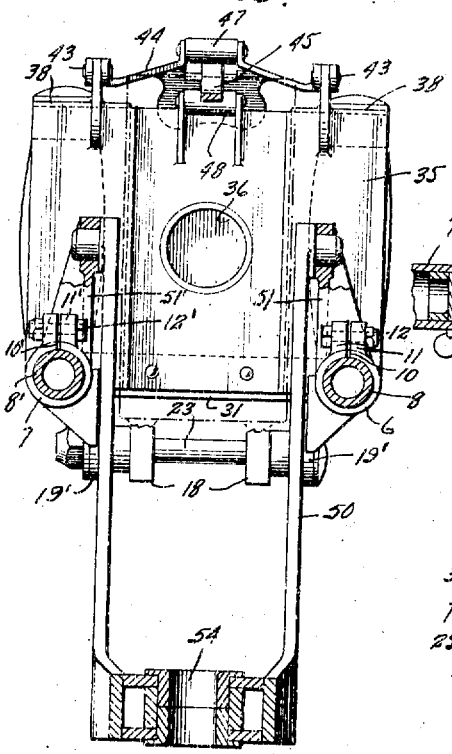
Figure 5 is a view taken along line 5—5 of Figure 1 looking in the direction of the arrows.

As best shown in Figure 5, the adapter 2 is pivotally mounted on a yoke 50 by means of two gussets 51 and 51' which are carried by the tubes 6 and 7 respectively. These gussets are so located on the frame 3 that the gun is well balanced for operation. The yoke members 50 terminate in any device suitable for enabling the gun to be easily rotated such as the collar 54 by which it may be attached to a gun mount.

In operation, the recoil of the gun 1 drives the piston rods 14 and 14' to the rear approximately one half an inch, and the slide blocks 22 and 22' also travel rearwardly the same distance on the slide tracks 19 and 19'.

The gun may be quickly dismounted or access to the breech may be quickly and easily had by removing the wing nuts 29 which secure the handles to the hollow tubes 6 and 7.

From the above description, it is obvious that I have provided an adapter for a machine gun which is of unusually light construction, and the parts of which are so arranged that the external dimensions have been reduced to a minimum. The construction of the handles and the back plate have also been arranged so that they can be readily removed, and the interior of the gun inspected. As previously mentioned, the construction of the adapter materially reduces the weight of the assembled gun, and its small overall dimensions particularly adapt it for use in close quarters, such as are usually found in aircraft construction. By placing small shock dampeners at the front of and close to the gun, there is no cumbersome structure on the rear of the gun to interfere with its operation.

While I have, for purposes of illustration, described one type of gun and adapter, it is obvious that any reciprocating gun could be used, and that many minor changes in the construction of the adapter could be made without departing from the spirit of this invention. I therefore wish only to be limited by the extent of the prior art and the scope of the appended claims.

I claim:

1. A supporting structure for machine guns having a buffer extension, comprising a cradle in which the machine gun is adapted to be mounted for forward and rearward movement, the cradle comprising a pair of parallel hollow tubular members, shock dampeners carried by the forward ends of each tube member and adapted to be operatively connected to the machine gun whereby the recoil of the gun during firing will be absorbed, a pair of operating handles removably secured to the rearward ends of the hollow tubular members, a transversely extending tubular member connecting said handles, a back plate attached to the transversely extending tubular member and a guard cooperating with the gun buffer extension provided in the back plate.

2. A supporting structure for machine guns having a buffer extension, comprising, a cradle in which the gun is adapted to be mounted for forward and rearward movement, the cradle comprising a pair of parallel hollow tubular members, shock dampeners carried by the forward end of each tube member and adapted to be operatively connected to the machine gun whereby the recoil of the gun during firing will be absorbed, a sleeve slidably mounted in the rearward end of each tubular member, means to lock each sleeve in each tubular member, a vertical handle carried by the free end of each sleeve, a transversely extending tube connecting each sleeve member adjacent to the handles, a back plate attached to the transversely extending member and bridging the gap between the handles, and a guard cooperating with the gun buffer extension provided in the back plate.

3. A supporting structure for machine guns having a buffer extension, comprising, a cradle in which the gun is adapted to be mounted for forward and rearward movement, the cradle comprising a pair of parallel longitudinally extending hollow tubular members, shock dampeners carried by the forward end of each tubular member and adapted to be operatively connected to the machine gun whereby the recoil of the machine gun during firing will be absorbed, a sleeve slidably mounted in the rearward end of each tubular member, means to lock each sleeve in each tubular member, a vertical handle carried by the free end of each sleeve member, a transverse member connecting the sleeves adjacent to the vertical handles, a back plate attached at its lower end to the transverse member, brackets securing the upper end of the back plate to the upper end of each handle, and a guard cooperating with the gun buffer extension provided in the back plate between the handles.

4. A supporting structure for machine guns having a buffer extension, comprising a cradle in which the machine gun is adapted to be mounted for reciprocatory movement, the cradle comprising a pair of interconnected parallel frame members, a dampening device adapted to operatively connect the machine gun with the cradle whereby transmission of recoil shock from the machine gun to the cradle is minimized, operating handles attached to the rear ends of the frame members, a transverse plate affixed to the rear portion of the frame members and a buffer guard secured to the plate.

5. A supporting structure for machine guns having a buffer extension, comprising a cradle in which the machine gun is adapted to be mounted for reciprocatory movement, the cradle comprising a pair of interconnected parallel frame members, a dampening device adapted to operatively connect the machine gun with the cradle whereby transmission of recoil shock from the machine gun to the cradle is minimized, operating handles attached to the rear ends of the frame members, transversely extending means connecting said handles and a buffer guard secured to said transversely extending means.

6. A supporting structure for machine guns having a buffer extension, comprising, a cradle in which the machine gun is adapted to be mounted for reciprocatory movement, the cradle comprising a pair of interconnected parallel frame members, a dampening device adapted to operatively connect the forward end of the machine gun with the cradle whereby transmission of recoil shock from the machine gun to the cradle is minimized, operating handles attached to the rear ends of the frame members, a transverse plate affixed to the rear portion of the frame members and a buffer guard secured to the plate.

7. A supporting structure for machine guns having a buffer extension, comprising a cradle in which the machine gun is adapted to be mounted for reciprocatory movement, the cradle comprising a pair of interconnected parallel frame members, a dampening device adapted to operatively connect the forward end of the machine gun with the cradle whereby transmission of recoil shock from the machine gun to the cradle is minimized, operating handles attached to the rear ends of the frame members, transversely extending means connecting said handles and a buffer guard secured to said transversely extending means.

8. A supporting structure for machine guns having a buffer extension, comprising, a cradle in which the machine gun is adapted to be mounted for forward and rearward movement, the cradle comprising a pair of parallel members, shock dampeners carried by each of the said members and adapted to be operatively connected to the machine gun whereby the recoil of the gun during firing will be absorbed, a pair of operating handles secured to the rearward ends of the members, a transversely extending member connecting said handles, a backplate attached to the transversely extending members and a guard cooperating with the gun buffer extension provided in the backplate.

9. A supporting structure for machine guns having a buffer extension, comprising, a cradle in which the machine gun is adapted to be mounted for reciprocatory movement, the cradle comprising a pair of interconnected parallel tubular members, a recoil dampening device adapted to operatively connect the forward end of the machine gun with the cradle whereby transmission of recoil shock from the machine gun to the cradle is minimized, operating handles detachably secured to the rear end of the tubular members, a transverse plate affixed to the rear portion of the tubular members and a buffer guard secured to the plate.

FRANK M. SALISBURY.